May 4, 1948.  R. POPP ET AL  2,440,873
UNIVERSALLY ADJUSTABLE SUPPORT
Filed March 31, 1945   2 Sheets-Sheet 1

INVENTOR
RUDOLF POPP
MARVIN C. CARLSON
ATTORNEYS

May 4, 1948. R. POPP ET AL 2,440,873
UNIVERSALLY ADJUSTABLE SUPPORT
Filed March 31, 1945 2 Sheets-Sheet 2

INVENTOR.
RUDOLF POPP
MARVIN C. CARLSON
BY Mueller, Dodds & Mason
ATTORNEYS.

Patented May 4, 1948

2,440,873

UNITED STATES PATENT OFFICE 2,440,873

UNIVERSALLY ADJUSTABLE SUPPORT

Rudolf Popp and Marvin C. Carlson, Valparaiso, Ind., assignors to McGill Manufacturing Company, Inc., Valparaiso, Ind., a corporation of Indiana Application March 31, 1945, Serial No. 585,946

3 Claims. (Cl. 248—276)

The present invention relates to improvements in universally adjustable supports of the character employed to support desk lamps, mirrors and the like, and more particularly to an improved support section adapted for use in a universally adjustable support.

In the manufacture of a support of the character described it is desirable to construct the support in sections having universal connections therebetween in order to provide for the desired degree of universal adjustment in the position of the object carried at the extended end of the support, and at the same time permit variations in the length of the support. This necessarily requires the use of a plurality of dissimilar parts in each support. From the standpoint of minimizing manufacturing cost, it is desirable to reduce to a minimum the number of dissimilar parts required, since the greater the number of parts, so also are the factors of tool and die construction and maintenance cost, inventory maintenance cost, assembly labor cost and shipping costs for transporting disassembled supports or replacement parts.

It is an object of the present invention, therefore, to provide an improved universally adjustable support having a relatively few dissimilar component parts.

It is another object of the invention to provide an improved sectionalized support of rugged construction made up of component parts which may be readily assembled to form a support of any desired length.

It is a further object of the invention to provide for use in a universally adjustable support, an improved two-part support section comprised of identical parts which may be easily and cheaply formed by die stamping or casting operations, and are adapted for complementary interlocking engagement by a very simple assembly operation.

According to still another object of the invention, the support section structure is such that it may be readily divided longitudinally into two parts of any desired length in order to permit threaded, welded or other connections to be made with other members.

In accordance with a still further object of the invention, the parts of each support section are arranged to coact in providing support for a circuit conductor or other cord-like element extending along the support.

It is yet another object of the invention to provide improved and exceedingly simple clamping facilities for mounting the support upon the edge of a bench, table or the like.

The invention both as to its organization and method of operation, together with further objects and advantages thereof, will best be understood by reference to the following specification taken in connection with the accompanying drawings, in which.

Figure 1:
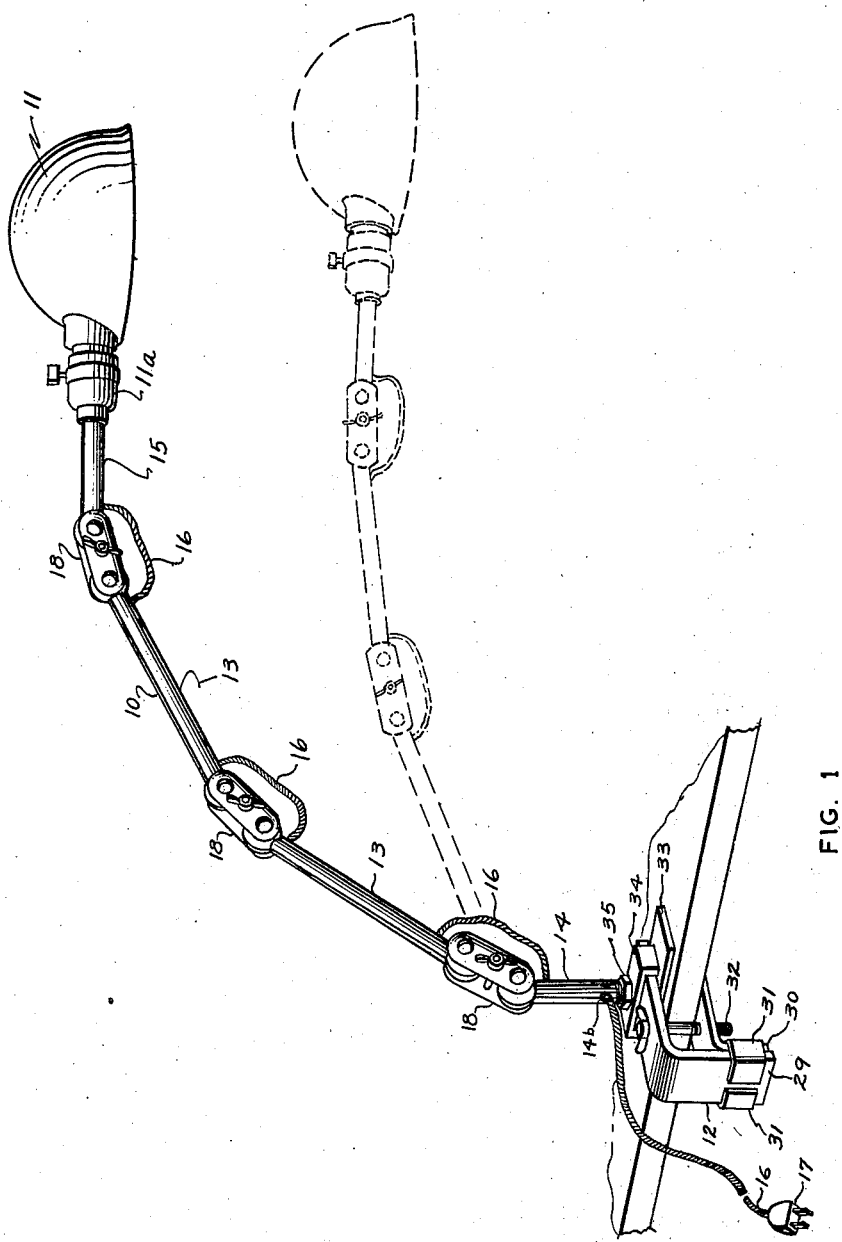
Fig. 1 is an elevational view illustrating an improved universally adjustable support characterized by the features of the present invention.

Referring now to the drawings, and more particularly to Fig. 1 thereof, the present improved universally adjustable support 10 is there illustrated in its use to support a lamp 11 in any desired position relative to a table or bench top to which the lower end of the support is attached by clamping means indicated generally at 12. In brief, the support comprises a plurality of intermediate sections 13 and end sections 14 and 15 which are respectively connected to a part of the clamp 12 and the lamp socket 11a. These sections are also utilized to support the lamp cord 16 leading to the lamp socket 11a and terminating in an end plug 17 through which electrical connections may be made to a standard outlet fixture. They are interconnected for universal relative movement therebetween by socket means 18 provided between each adjacent pair of support sections.

Figure 2:
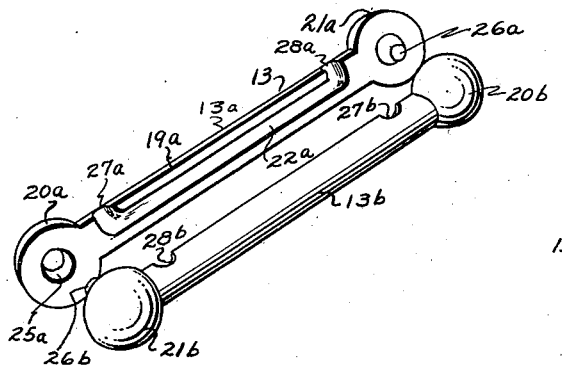
Fig. 2 is an exploded view in perspective illustrating the two-part construction of the intermediate sections of the support.
Figure 3:
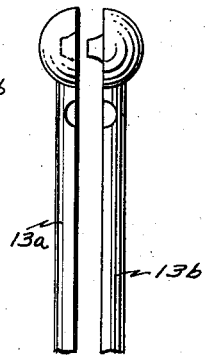
Figs. 3 and 4 are fragmentary views of the support section shown in Fig. 2 illustrating the mode of assembly thereof.
Figure 4:
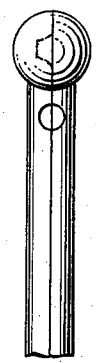
Figure 5:
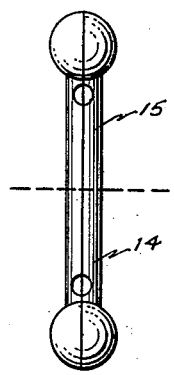
Fig. 5 is a side view illustrating the manner in which a whole support section may be divided into two parts to form the end sections of the support.

In accordance with the present invention, and as best shown in Figs. 2, 3 and 4 of the drawings, each intermediate section 13 of the support comprises a pair of elongated, longitudinally complementary and interlocked members 13a and 13b having complementary segmental spherical portions 20a and 21a at the respective ends thereof which coact to provide spheroidal bearing surfaces. The members 13a and 13b are respectively provided with internal grooves 22a for receiving a segment of the cord 16 through openings formed by registering recesses 27a and 28a formed in the engaging edges of the members adjacent the respective ends thereof. The spherical or half-ball end parts of each member are solid and are provided with complementary locking means engageable with the corresponding means of the other member to interlock the two members against relative longitudinal or transverse movement. More specifically, the spherical end portion 21a of the member 13a has centrally disposed thereon a locking stud 26a which projects beyond the edges of the member. The opposite spherical end portion 20a of the member 13a is provided with a centrally disposed stud receiving recess 25a which is formed to receive the stud 26b of the member 13b. It will thus be understood that interlocking engagement of the two members 13a and 13b is obtained during assembly of the support by bringing these two members into engagement with one member reversed with respect to the other so that the stud 26a of the member 13a enters the recess of the member 13b and the stud 26b enters the recess 25a. Preferably, the identical section members 13a and 13b are formed by die forming operations, although if greater strength is required, they may be produced by conventional die or mold casting methods. In either case, however, the same dies or molds may be used in forming all sections of the support, including the end sections 14 and 15.

Figure 6:
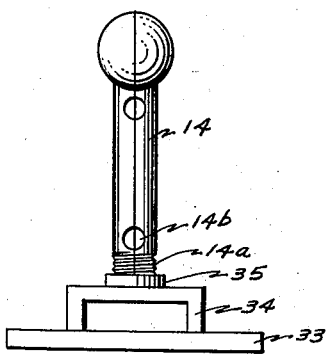
Fig. 6 is a side view illustrating the mounting arrangements for the lower end section of the support.
Figure 7:
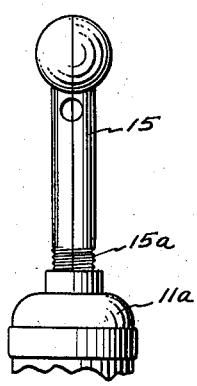
Fig. 7 is a side view illustrating the manner in which the object to be supported, i. e. a lamp, is attached to the upper end section of the support.

Specifically, the end sections 14 and 15 are formed by cutting a pair of section members 13 to the required length and threading the shank portions thereof in the manner indicated at 14a and 15a in Figs. 6 and 7 of the drawings. If extremely short end sections are required any intermediate portion of the selected pair of members 13 may be removed by two cutting operations in order to obtain end sections of the desired length. On the other hand, if long end sections 14 and 15 are required in making up the support, two pairs of members 13 may be cut off adjacent their ends and threaded along the shank portions thereof. Further, and as indicated at 14a in Figs. 1 and 6 of the drawings, registering cord receiving recesses may be formed at any point along the edges of the two section members in order to provide the desired cord support. Thus, it will be apparent that all sections of the support may easily be made up from section members which are of identical construction and are readily susceptible of manufacture by production methods.

Figure 8:
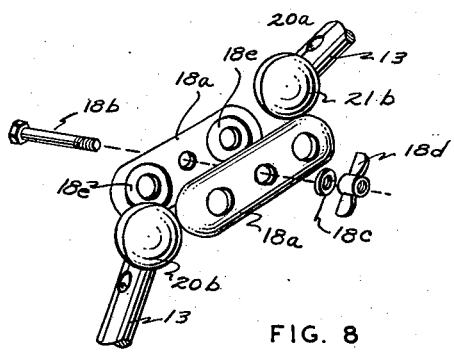
Fig. 8 is an exploded view in perspective illustrating the construction of the socket means employed to interconnect each adjacent pair of support sections.
Figure 9:
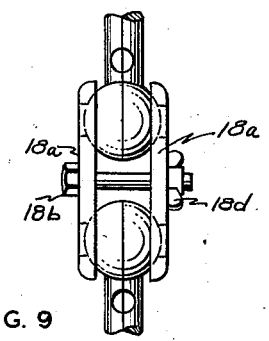
Fig. 9 is a side view illustrating the parts shown in Fig. 8 in their fully assembled relationship.

As best shown in Figs. 8 and 9 of the drawings, each socket assembly 18 is comprised of a pair of socket members 18a, a clamping bolt 18b extending through registering openings centrally disposed longitudinally of the socket members, a wing nut 18d engageable with the bolt 18b and a lock washer 18c. The socket members 18a are of identical construction, each being provided at its respective ends with spheroidal bearing surfaces 18e engageable with the outer spheroidal bearing surfaces of each support section.

The bench clamp 12 upon which the lower end section 14 of the support is mounted, is comprised of a pair of L-shaped clamping members 29 and 30, the base legs of which are retained in engagement by means of a retaining member 31 wrapped therearound and secured to the base of the member 30. This retaining member permits relative sliding movement between the base legs of the clamping members, thereby to provide for movement of the clamping legs of the two members toward and away from each other. A wing headed clamping bolt 32 extending through an opening in the top portion of the member 29 and threaded into an opening through the lower clamping member 30 is utilized to produce the required clamping force. The upper clamping member 29 slidably carries a clamping base 33 which supports a U-shaped slide member embracing the top portion of the clamp member 29. This slide member is drilled and threaded centrally of the top portion thereof to receive the threaded end 14a of the lower support section 14, and a lock nut 35 is utilized to prevent this section of the support from being inadvertently unscrewed from the slide member 34. By embracing the sides of the clamping leg of the member 29, the U-shaped member 34 prevents the base member 30 and the end support section 14 from turning during adjustment of the support.

As will be evident from the above explanation, various methods may be employed in assembling the parts of the support with each other and with the lamp 11. One method which may conveniently be practiced is that of first screwing the threaded ends of the members forming the upper end section 15 into the end of the lamp socket 11a, threading the end of the cord 16 through the central recess within these members, and then making the required circuit connections with the terminals of the socket. Following this operation, the upper intermediate support section may be assembled by positioning the members 13a and 13b thereof to embrace a segment of the cord, the ends of which extend outwardly through the openings formed by the recesses 27a, 28a, 27b and 28b. Two socket members 18a are next positioned so that the spheroidal bearing surfaces 18e thereof engage the spherical end portions of the end section 15 and the upper intermediate section 13, following which the screw and nut of the socket assembly may be manipulated to produce clamping engagement of the socket members with the described section ends. This assembly step may be repeated at each section junction point until a sectionalized support of the desired length is obtained and the lower end section 14 is assembled therewith. The final step is that of screwing the threaded end of the lower end section 14 into the slide member 34 and setting the lock nut 35 to provide a fixed connection therebetween. After assembly, the clamping means 12 may be employed in an obvious manner to clamp the support at any desired point along the edge of a bench or table. Further, due to the ball and socket connections between the several sections of support, the lamp 11 may be readily adjusted to any desired position overlying the table top in the manner illustrated in Fig. 1 of the drawings.

From the above explanation, it will be apparent that aside from the clamping assembly, the present improved support includes only two non-standard parts, i. e. the members making up the sections 13 and the socket members 18a. In this regard it will be understood that standard bolts 18b, lock washers 18c and wing nuts 18d may be employed in the socket assemblies. Since only two non-standard parts are required in the production of a support of any desired length, and these parts are susceptible of manufacture by high speed production methods, such, for example, as by the use of stamping machines, the manufacturing cost of the supports is minimized for the reasons pointed out above.

While one embodiment of the invention has been described, it will be understood that various modifications may be made therein which are within the true spirit and scope of the invention as defined in the appended claims.

We claim:

1. A universally adjustable support comprising a plurality of sections each including a pair of elongated, longitudinally complementary members, the members of each complementary pair including complementary segmental spherical portions at each end which coact to provide spheroidal bearing surfaces, means integral with said members for interlocking the members of each pair, at least one of the members of each pair having an internal groove open adjacent each end thereof for receiving a cord-like element, and socket means cooperating with said bearing surfaces to interconnect said sections for universal relative movement.

2. For use in a universaly adjustable support, a support section comprising a pair of elongated and longitudinally complementary members having complementary segmental spherical portions at each end which cooperate to provide spheroidal bearing surfaces adapted to coact with socket means, each of said members having a locking stud disposed centrally of the spherical segment at one end and a complementary stud receiving recess disposed centrally of the spherical segment at the opposite end, whereby interlocking engagement of said members is obtained by reversing one member with respect to the other, at least one of said members having an internal groove open adjacent each end thereof for receiving a cord-like element.

3. A universaly adjustable support comprising a plurality of intermediate sections each including a pair of identical elongated complementary and interlocked members and two end sections each including a pair of elongated complementary and interlocked members, the complementary members of each intermediate section being provided at each end and the complementary members of each end section being provided at one end with complementary segmental spherical portions which coact to provide spheroidal bearing surfaces, socket means cooperating with said bearing surfaces to interconnect said sections for universal relative movement, a supporting base comprising a base portion and a U-shaped portion upon which the complementary members of one of said end sections are mounted, a pair of L-shaped clamping members provided with base legs and with clamping legs adapted to receive a supporting member therebetween, one of said clamping legs being slidably receivable within said U-shaped portion to overlie said base portion, means holding said base legs in engagement while permitting relative sliding movement therebetween, thereby to provide for movement of said clamping legs toward and away from each other, and means cooperable with said clamping legs to produce movement thereof toward and away from each other.

RUDOLF POPP.
MARVIN C. CARLSON.

REFERENCES CITED

The following references are of record in the file of this patent:

UNITED STATES PATENTS

| Number | Name | Date |
| --- | --- | --- |
| 703,729 | Kupfer | July 1, 1902 |
| 817,871 | Pickles | Apr. 17, 1906 |
| 864,968 | Johnson | Sept. 3, 1907 |
| 1,088,690 | Erwin | Mar. 3, 1914 |
| 1,703,069 | Strupe | Feb. 19, 1920 |
| 1,760,346 | Correa | May 27, 1930 |
| 2,087,812 | Peluse | July 20, 1937 |